US005101224A

United States Patent [19]

Freed, Jr.

[11] Patent Number: 5,101,224

[45] Date of Patent: Mar. 31, 1992

[54] INK JET PRINT HEAD SUPPORT

[75] Inventor: Donald L. Freed, Jr., Belleville, Ill.

[73] Assignee: Marsh Company, Belleville, Ill.

[21] Appl. No.: 365,311

[22] Filed: Jun. 13, 1989

[51] Int. Cl.[5] .......... G01D 15/00

[52] U.S. Cl. .......... 346/145; 346/75; 346/140 R; 400/55

[58] Field of Search .......... 346/75, 140 R, 145; 364/900; 400/55, 56

[56] References Cited

U.S. PATENT DOCUMENTS

| | | | |
|---|---|---|---|
| 3,904,010 | 9/1975 | Krauss et al. | 400/56 |
| 4,168,533 | 9/1979 | Schwartz | 346/75 |
| 4,378,564 | 3/1983 | Cross et al. | 346/75 |
| 4,570,168 | 2/1986 | Stordal et al. | 346/195 |
| 4,814,795 | 3/1989 | Kuester et al. | 346/140 R |

FOREIGN PATENT DOCUMENTS

| | | |
|---|---|---|
| 088630 | 9/1983 | European Pat. Off. . |
| 59-12882 | 1/1984 | Japan . |

OTHER PUBLICATIONS

Smith, R. L., Self-Compensating Printhead-to-Paper Gap, Technical Disclosure vol. 26, No. 3b, pp. 1354, 1355 8-83.

Rex, D. K., Printhead Spacing Adjustment for Paper Thickness, Technical Disclosure vol. 26, No. 3b, pp. 1476, 1477, 8-83.

Rex, D. R. Printhead Adjustment, Technical Disclosure vol. 26, No. 12, 6373, 6374, 5-84.

Humphreys, F. R., Floating platen for Printing on Irregular contour Technical Technical Disclosure vol. 15, No. 1, 179, 6-72.

Marsh M4 Roller Coder Publication, Instructions Marsh Stencil Co., Belleville, IL 1983.

*Primary Examiner*—Benjamin R. Fuller

*Assistant Examiner*—Gerald E. Preston

*Attorney, Agent, or Firm*—Rogers, Howell & Haferkamp

[57] ABSTRACT

A pair of ink jet print heads are arranged on opposite sides of a conveyor to apply ink markings to the opposed surfaces of material conveyed on the conveyor. The print heads support ink jet nozzle blocks having at least one ink jet nozzle and are pivotally biased out over the conveyor in the path of the conveyed material. A pair of cams positioned on opposite sides of the ink jet nozzle blocks maintain a critical spacing between the nozzle block and the surface of the material. Ramp surfaces and an exit cam control the rate at which the ink jet print heads are pivoted away from and toward the path of the conveyed material as the material is conveyed before the ink jet print heads.

20 Claims, 3 Drawing Sheets

FIG. 1.
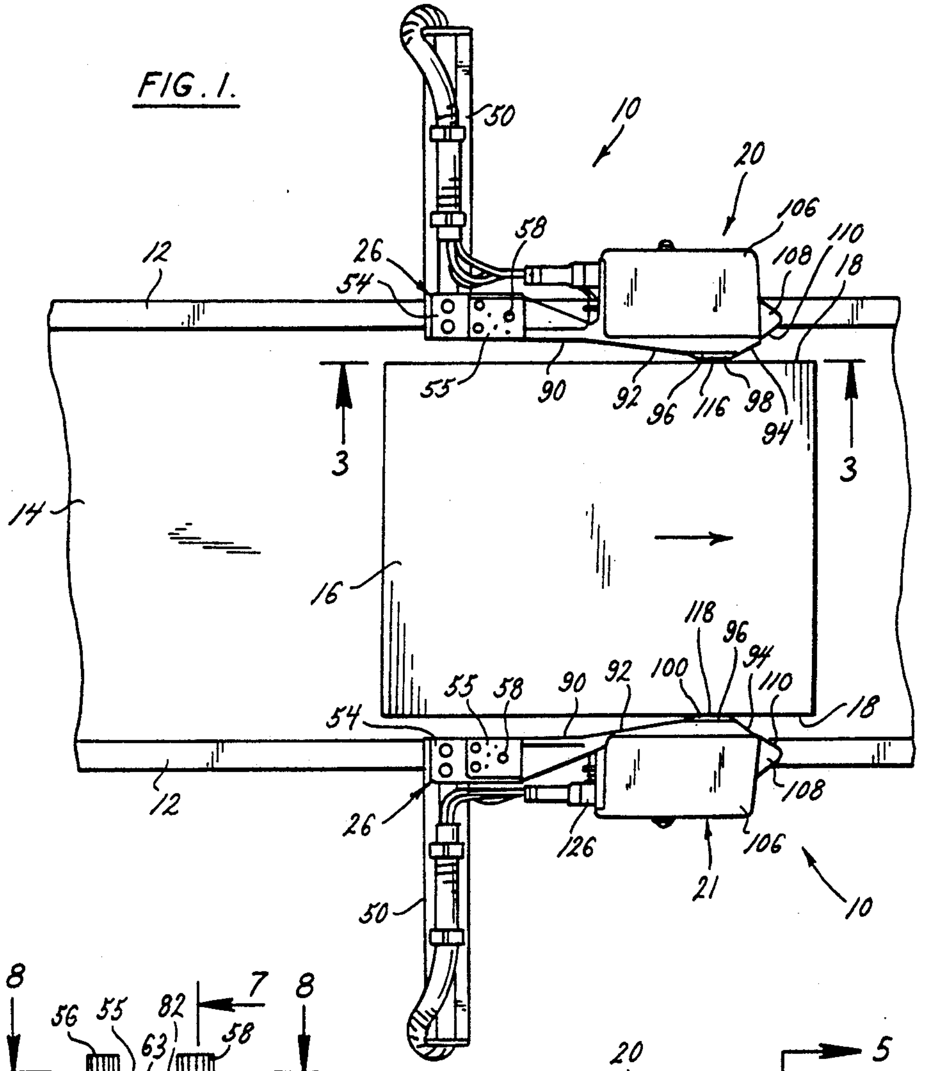
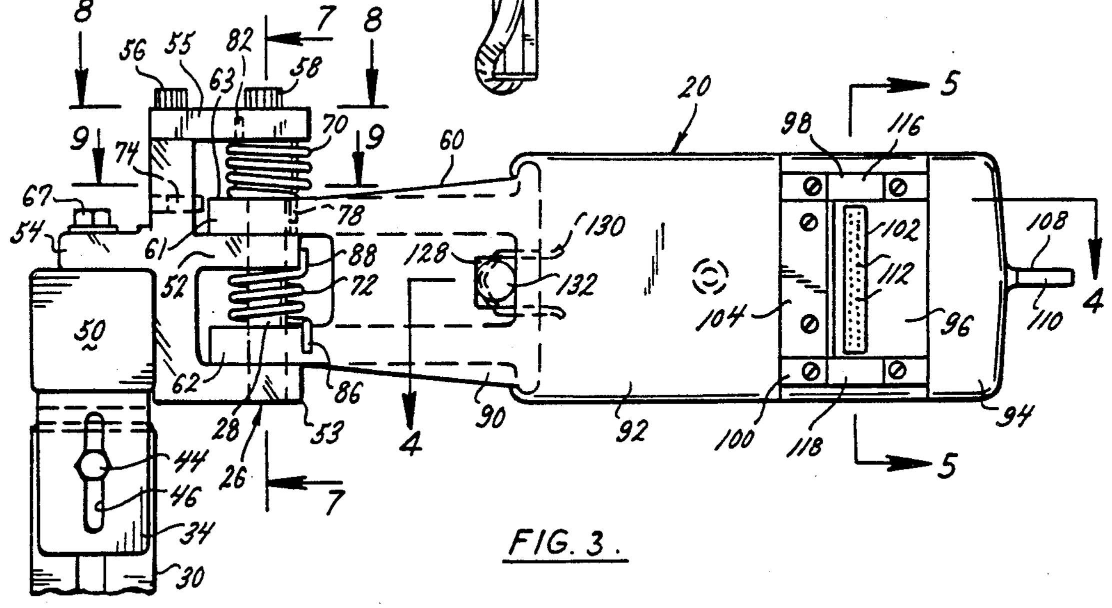
FIG. 3.

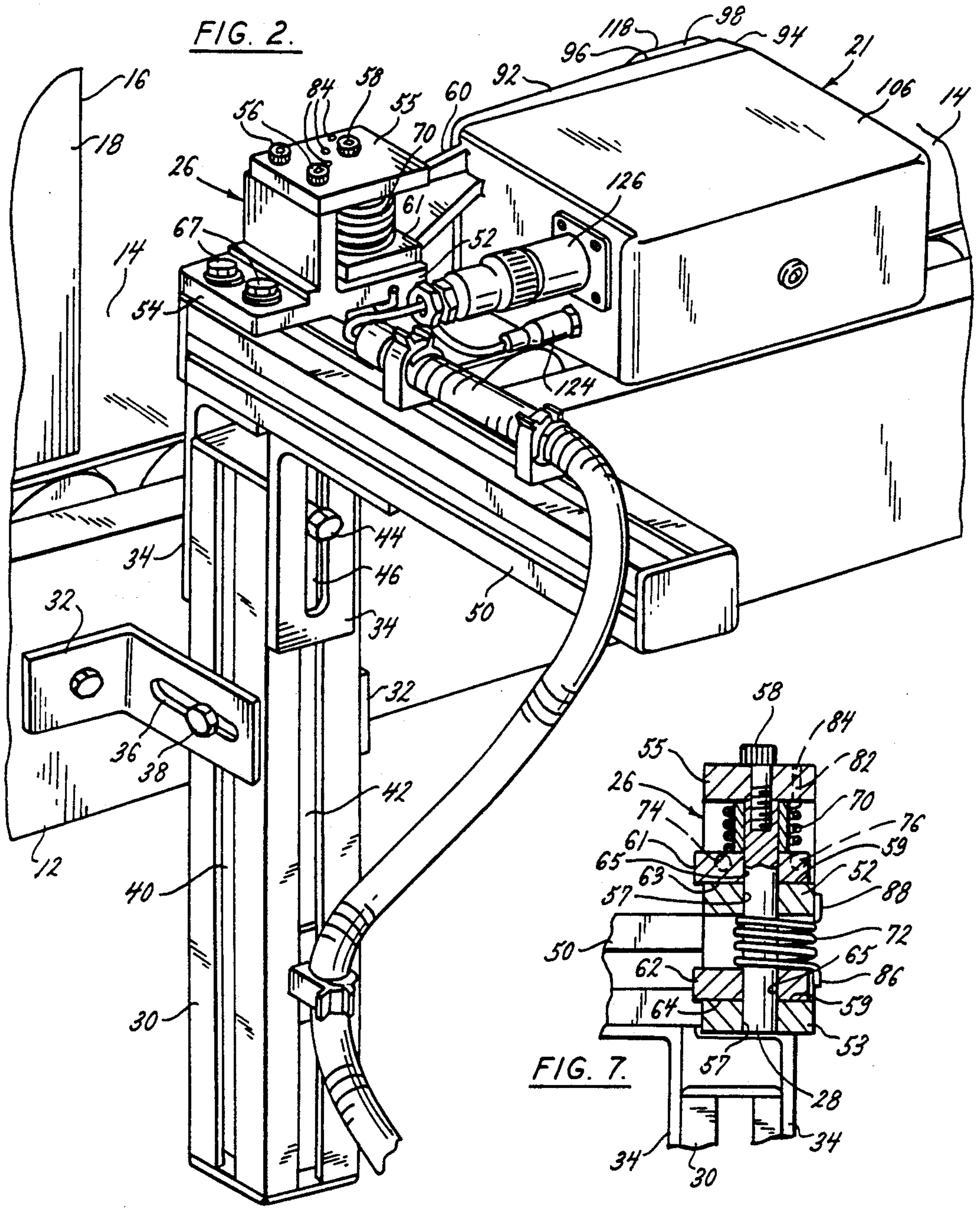
FIG. 2.
FIG. 7.
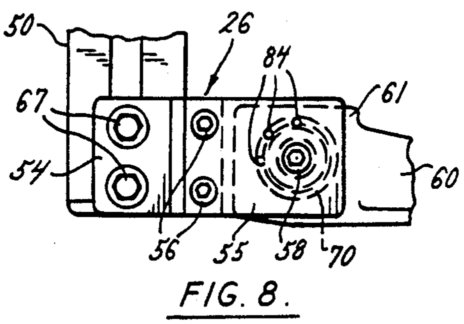
FIG. 8.
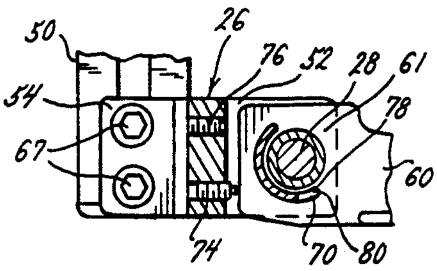
FIG. 9.

INK JET PRINT HEAD SUPPORT

BACKGROUND OF THE INVENTION (1) Field of the Invention

This invention relates to an ink jet printing apparatus and more particularly to an improvement over an ink jet print head and support of the kind disclosed in related application Ser. No. 045,832 filed May 1, 1987, now U.S. Pat. No. 4,814,795, and assigned to the assignee of this invention and herein incorporated by reference. Print head holders of this type maintain a predetermined space relationship between the ink jet print head of the printing apparatus and the surface of materials such as cartons or the like that are to receive the ink printing or marking.

The ink jet print head and support of the invention are adapted to be incorporated into an ink jet printing apparatus of the kind that can be operated to apply ink markings to a surface such as on the side of a carton or container conveyed past the printing apparatus. The markings can be characters, symbols and bar codes. Ink jet printing apparatus of this type generally include one or more print heads for printing on one or more sides of the carton.

(2) Description of the Related Art

In conventional ink jet print heads employed in ink jet printing apparatus, each print head has a vertical array of orifice nozzles from which ink can be emitted under pressure in the form of droplets emerging from the print head for impact upon the material surface. The nozzles are connected through individual valves to an ink source that is maintained under pressure. A programmable controller regulates the operation of the valves to cause ink to flow through the valves to the nozzles and to be emitted from the nozzles according to a pre-selected pattern or patterns. In this way, the ink droplets form the desired symbol, character, or bar codes on the material surface.

Ink emitted from an ink jet nozzle must travel a small fraction of an inch to form an ink droplet. This ink droplet grows wider as the distance of travel from the nozzle to the printing surface increases. As the width of the droplet increases a larger dot will be printed upon the material surface impacted by the droplet. As a result, as the droplet gets wider, the outer edges of the printed dots lose precision, and the quality of the printing deteriorates.

In a typical installation, the surfaces to receive the printing move relative to the print head or print heads. For example, the surfaces may be defined as one or more sides of a package such as a carton or container, and there may be a plurality of such packages in a row on a conveyor that transports the packages successively past the print head or print heads. It is common to have one or more print heads on opposite sides of the conveyor so that printing can be done on opposite faces of the package simultaneously.

To guide the packages into position relative to the print head or print heads, guide rails are commonly provided on opposite sides of the conveyor. These guide rails define planes that are spaced a predetermined lateral distance relative to the face of the nozzle block, and the guide rails confine the packages between them as they are transported by the conveyor. However, packages of the same nominal size vary in width due to manufacturing tolerances and there are undulations in the faces of the packages. Therefore, the span between guide rails must be great enough to accommodate the widest of the packages as permitted by the size tolerances. Smaller packages within the tolerances may not contact the guide rails. Accordingly, although the guide rails hold the packages at nominal distances from the print head nozzles, those distances vary as different package surfaces pass the nozzles and are imprinted. Yet, regardless of package size and position, at the instant ink droplets are emitted from the nozzles, the span between the face of the nozzle block and an opposing substrate or surface must be optimal.

Efforts have been made to improve the quality of ink jet printing, resulting in improvements in the design of the nozzle such as by the incorporation of jewelled orifice nozzles, and resulting in improvements in the composition of the inks. Examples of the results of some of these efforts are set forth in U.S. Pat. No. 4,378,564.

In all of these applications to date, an optimum range of space between the ink jet nozzles on the print head and the surface of the material to receive the printing has existed and print quality has been limited by the tolerance in the spacing that was needed to accommodate the variations in sizes of the packages.

Means of reducing this tolerance have recently been developed such as that disclosed in the related application Ser. No. 045,832, now U.S. Pat. No. 4,814,795 incorporated herein by reference, where print heads of the jet printing apparatus are spring biased toward the surface to be printed to maintain a substantially constant spatial relation between the ink jet nozzles and the surface of the container to be printed. The disadvantages of this system are that it requires an additional, separate slide mount structure to support the print head. The slide mount structure comprises rods slidably received in bearings that support the print head for transverse movement toward the substrate or surface. The operative surfaces of the rods are exposed and likely to collect dust and dirt in normal operation of the slide mount. The collection of dust and dirt on the rods impedes the proper operation of the slide and negatively affects the quality of the printing on the surface of the materials conveyed past the print head. Additionally, it is possible that the rods could become bent during the operative life of the slide mount. A bend in one of the rods would also impede the proper operation of the slide and have a negative effect on print quality.

SUMMARY OF THE INVENTION

This ink jet print head and support are mounted on the side of a conveyor upon which packages, such as cartons, containers or the like can be transported. In a typical installation, there may be printing stations on opposite sides of the conveyor and each printing station may incorporate a plurality of print heads and supports.

The support for each print head is in turn supported by channels, and the channels are connected to the frame in a manner that allows the positions of the channels and therefore of the print head support to be adjusted relative to the conveyor. Lateral adjustment of the channels adjusts the span between the printing stations for accommodating different widths of packages. Thus, a run of packages of one nominal size can be completed, the channels can be laterally moved, and a run of packages of another nominal size can follow. Vertical adjustment of the channels sets the proper height of the print head.

To accurately maintain the selected distance through which the ink droplets are to traverse, each print head is formed with an arm that is pivotally mounted on a bracket supported by the frame of the printing apparatus. Biasing means, such as a torsion spring, biases the print head to pivot toward the conveyor and the packages conveyed by it. The inner side of the print head arm is generally in the plane of the conveyor side guide rail and functions as an extension of the guide rail. Immediately downstream of the print head arm the print head has a gently inclined inner face that, if contacted by a package, will progressively push the printhead outwardly. Next, vertically aligned nylon guards on the face of the print head have leading, positioning, and trailing faces. The leading faces are more sharply inclined than the aforesaid inner face of the print head, and they cam the print head further outwardly when contacted by a package. The positioning faces are held in contact with the package as the package moves past the nozzle block, and these positioning faces of the cam plates set the desired distance between the outlet of the orifice nozzle and the surface of the material to be printed. The trailing faces of the guards are at angles that allow the torsion spring to produce initial return of the print head toward its inward, at rest, position. The biasing means causes the print head to press the guard faces in constant contact with the carton.

The face of the print head is also angled laterally outward adjacent its trailing end, so that as the package leaves the trailing faces of the nylon guards, it will engage this trailing face of the print head, enabling the torsion spring to pivot the print head further inward toward the conveyor. An additional cam surface is provided on a nylon guide attached to the end of the print head. As the package disengages its contact with the trailing face of the print head, it comes into contact with the cam surface on the guide. This cam surface is at a greater angle than the trailing face of the print head. As the package is conveyed across the surface of the cam plate, the torsion spring causes the print head to pivot inward toward the conveyor to arrive at its at-rest position over the conveyor.

The standards for bar code printing require that the printed bar code extend close to the bottom of the package. To meet this standard, and to allow installation on either side of the conveyor, the print head is symmetrical and can be inverted to face left or right from either the left or right side of the conveyor. The support bracket can be mounted on the left or right side of the conveyor and it is equipped with left and right hand torsion springs, one being selected for use and the other being stored on the bracket. Proper selection of the torsion springs will bias the print head inwardly whether installed on the left or the right side of the conveyor.

In addition to supporting the nozzle block and control valves, the print head supports a photocell at a predetermined distance upstream of the nozzle block. The photocell initiates the printing cycle when it detects an approaching carton. Thus the print head is of simple, durable construction that supports the foregoing components as well as the cam blocks and that has an integral mounting arm. The pivotal support bracket can have a bearing contact with the print head to assure repeated low friction operations.

BRIEF DESCRIPTION OF THE DRAWINGS

Further features of the present invention are revealed in the following description of the preferred embodiment and in the drawing figures where:

FIG. 1 is a plan view of two of the print heads and supports of the invention showing their positions relative to a conventional material conveying means;

FIG. 2 is an enlarged perspective view of a print head and support secured to the side of a conventional printing apparatus conveying means;

FIG. 3 is an elevation view of the orifice side of the print head and its associated support taken along the Line 3—3 of FIG. 1;

FIG. 7 is an elevation view in section taken along the Line 7—7 of FIG. 3 showing the detail of the hinge structure of the pivot bracket;

FIG. 8 is a plan view taken along the Line 8—8 of FIG. 3 showing the top of the pivot bracket; and FIG. 9 is a plan view in section taken along the Line 9—9 of FIG. 3 of the pivot bracket.

DETAILED DESCRIPTION OF THE PREFERRED EMBODIMENT

Figure 5:
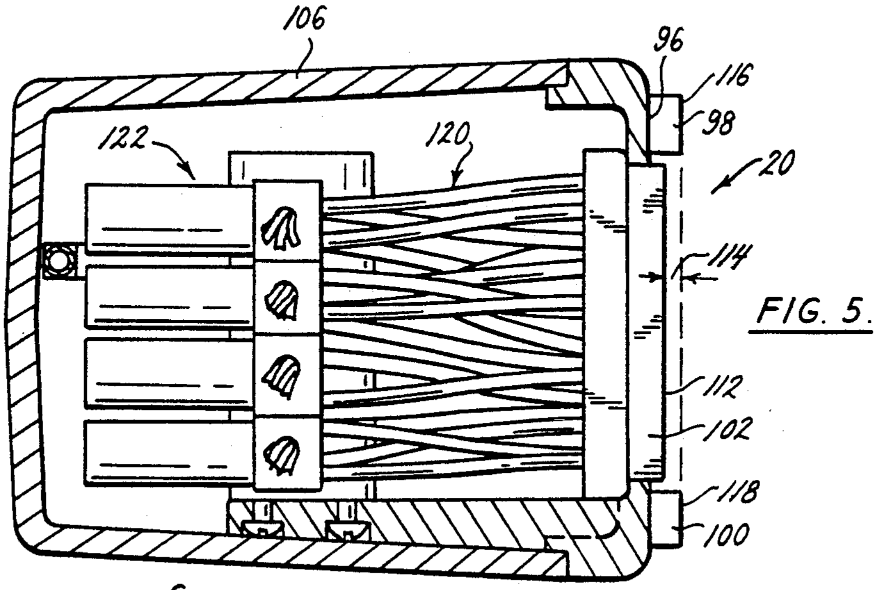
FIG. 5 is an elevation view in section taken along the Line 5—5 of FIG. 3.

FIG. 1 shows a pair of printing stations 10 positioned on opposite sides of a conventional conveyor such as that disclosed in application Ser. No. 045,832. The conveyor comprises a support structure 12 and a conveyor belt 14 for transporting containers or cartons 16 along the belt between the printing stations 10 for the application of ink markings such as characters, symbols, or bar codes to the side surfaces 18 of the container 16. The printing stations 10 include the ink jet print heads, 20 and 21 respectively, of the present invention. Each ink jet print head 20, 21 is pivotally supported by a support bracket 26 and is bias to pivot about a pivot pin 28 into the path of the containers 16 conveyed by the conveyor 14 in a manner to be described later.

FIG. 2 is a perspective drawing of one of the ink jet printing stations at the side of the conveyor. The ink jet printing station includes an extruded vertical support member 30 which is secured to the frame 12 by a bracket 32. The bracket 32 has a horizontal slot 36 through which a securing pin 38 extends and engages in a vertical slot 40 in the vertical support member 30. The slot 36 and pin 38 permit adjustment of the lateral position of the vertical support member 30 relative to the frame 12. Likewise, the pin 38 and slot 40 provide for vertical adjustment of the support member 30 relative to the frame 12 of the conveyor.

An additional bracket 34 is secured to the vertical support member 30 by a pin 44 that extends through a slot 46 in the bracket 34. The bracket 34 mounts an extruded horizontal support member 50 to the vertical support member 30. The connection between the bracket 34 and the horizontal support member 50 may also be a pin and slot structure such as that employed on the vertical support member 30 to enable lateral adjustment of the horizontal support member 50 relative to the frame 12.

The support bracket 26 has two vertically spaced support arms 52 and 53, a mounting flange 54, and a top plate 55 that is connected to the bracket body by manually threadable studs 56. The pivot pin 28 extends vertically through holes 57 in the support arms 52 and 53 and extends upwardly to the top plate 55 where it is releasably secured by a manually threadable stud 58. The support arm 53 has a bearing face 59.

The support bracket is secured to the horizontal support member 50 by bolts 67 through the flange 54 and thus can be adjusted either vertically or horizontally to a desired position.

The ink jet print head 20 has an integral arm 60 that terminates in spaced support lugs 61 and 62. The support lugs have bearing faces 63 and 64, respectively. The lugs 61 and 62 have holes 65 through them to receive the pin 28.

The support bracket 26 is constructed in such a manner that it may be mounted on either side of the conveyor frame 12 without changing the orientation of the support bracket 26 relative to the conveyor. This is best seen in FIG. 1. The orientation of both support brackets 26 on the opposite sides of the conveyor is the same. In order for support bracket 26 to be adaptable for use on both sides of the conveyor, the bracket assembly is provided with two torsion springs 70 and 72 and two adjustable abutments 74 and 76. Only one of the torsion springs and one of the adjustable abutments is used on each side of the conveyor. The face 59 of the support bracket support arm 53 acts as the bearing surface for either lug 61 or 62 of the print head 20, and is subjected to the weight of the print head. Regardless of whether the bracket 26 is mounted on the left or right side of the conveyor, one of the bearings surfaces 63 or 64 bears against the bearing surface 59 that supports the weight of the print head 20.

The torsion spring 70 has a left hand helix and the torsion spring 72 has a right hand helix. For a print head positioned on the right side of the conveyor as viewed in FIG. 1, the torsion spring 70 having the left hand helix is employed to bias the print head 20 to pivot out into the path of travel of the carton 16 on the conveyor. An end 78 of the spring 70 closest to the lug 61 of the print head is bent at a right angle and inserted into a hole 80 in the lug 61. The opposite end 82 of the spring 70 is also bent at a right angle and inserted into one of several adjustment holes 84 in the top plate 55 of the bracket 26. By selectively inserting the end 82 of the spring 70 into different adjustment holes 84, the biasing force of the spring 70 can be adjusted.

A pair of adjustable abutments 74 and 76 are threaded into the support bracket 26 as seen in FIGS. 3 and 9. The extent by which the abutments 74, 76 protrude from the bracket 26 can be adjusted by turning the abutments. The bottom-most adjustable abutment 74 in FIG. 9 is adjusted for the ink jet print head 20 of FIG. 1. The torsion spring 70 causes the ink jet print head 20 to pivot clockwise about the pivot pin 28 as viewed in FIG. 9, until the support lug 61 contacts the extended adjustable abutment 74, thereby limiting the extent to which the ink jet print head 20 will pivot out over the conveyor. By adjusting the extent that the abutment 74 extends from the bracket 26, the extent to which the print head 20 will pivot out over the conveyor is adjusted.

The assembly of the ink jet print head 20 and its associated support bracket 26 positioned on the right of the conveyor as shown in FIG. 1 has been described above with reference to FIGS. 3, 7, and 9. In this assembly the torsion spring 70 having a left hand helix is used to bias the ink jet print head 20 out over the conveyor, and the adjustable abutment 74 is extended from the bracket 26 to limit the extent to which the ink jet print head 20 pivots out over the conveyor.

For the ink jet print head 21 and bracket assembly 26 shown on the left side of the conveyor in FIG. 1, a bracket 26 is secured to the horizontal support member 50 on the left side of the conveyor with its support arms 52 and 53 pointing in the same direction as the support arms of the bracket 26 mounted on the right side of the conveyor. The orientation of the bracket 26 remains the same as that seen in FIGS. 3, 7, 8, and 9. However, the ink jet print head is flipped over to face the conveyor so that its position relative to the bracket 26 is the reverse of that shown in FIG. 3. In this position, the ink jet print head 21 is biased out over the conveyor by the torsion spring 72 having a right-hand helix. The ink jet print head 21 and support bracket 26 are assembled so that the bearing face 63 of the support lug 61 rests against the bearing face 59 of the bracket support arm 53, and the support lug 62 is positioned above the bracket support arm 52. The pin 28 is secured in place by the stud 58 as described above. However, now the torsion spring 72 is positioned in the operative position at the top of the bracket 26 with one of its deflected ends 86 positioned in the hole 80 in the support lug 62 of the print head 21 and the other of its deflected ends 88 positioned in one of the adjustable holes 84 in the top plate 55 of the bracket 26. The inoperative torsion spring 70 with the left-hand helix is placed in the inoperative position at the bottom of the bracket 26.

The adjustable abutment 74 shown at the bottom of FIG. 9 is screwed into the bracket 26. The adjustable abutment 76 shown at the top of FIG. 9 is screwed out of the bracket 26 a desired extent to provide the abutment which limits the pivoting movement of the ink jet print head 21 out over the conveyor.

The ink jet print head 21 and the associated bracket 26 assembled in the manner described above are positioned at the left side of the conveyor shown in FIG. 1. In this assembly, the ink jet print head 21 will be spring bias to pivot in a direction opposite to that of the ink jet print head 20 positioned at the right side of the conveyor so that both print heads 20 and 21 are bias to pivot out over the conveyor. The extent to which the print heads 20 and 21 pivot out over the belt 14 is limited by the extent to which the respective adjustable abutments 74 and 76 extend from the respective brackets 26.

It is pointed out that the specific configuration of the support bracket 26 allows the same bracket to be used in mounting an ink jet print head 20, 21 to either side of the conveyor. The bracket support arms 52 and 53 always point in the direction of travel of the conveyor and the top plate 55 is always positioned at the top of the bracket 26 regardless of whether the bracket is positioned on the right or left side of the conveyor. This permits the same bracket 26 to be used in mounting the print head 20, 21 on either side of the conveyor while providing the same spacial relationship between the bottom edge of both ink jet print heads 20 and 21 and the surface of the belt 14 of the conveyor.

FIG. 3 shows the side face of the ink jet print head and its connections with the support bracket 26. The face of the ink jet print head includes the face surface 90 of the integral arm 60. This surface is substantially parallel to the path of the conveyor, and is generally in the path of adjacent conveyor side guide rails (not shown)

and functions as an extension of the guide rails. Immediately downstream of the arm surface 90 in the direction of package travel is a first inclined surface 92 gently angled laterally inward toward the center of the conveyor. A second trailing surface 94 of the ink jet print head face is angled laterally outward away from the center of the conveyor. A third surface 96 of the print head face connects the first surface 92 and the second surface 94 and supports a pair of vertically aligned positioning cams 98, 100 and the ink jet nozzle block 102. A nozzle block shield 104 having a triangular cross-section is also supported on the third surface 96 of the ink jet print head face. A cover 106 is connected to the ink jet print head to protect the ink jet print head valves and their related control structure in the interior of the print head. The cover 106 includes a guide 108 having a cam surface 110. The guide 108 extends from the ink jet print head cover 106 in the direction of travel of the conveyor. The cam surface 110 of the guide 108 is set at a greater angle than the trailing surface 94 of the print head.

The ink jet nozzle block 102 comprises a plurality of orifices or nozzles 112 arranged to eject ink droplets onto the surface 18 of containers 16 as they are conveyed past the nozzle block 102. The nozzles 112 are maintained at a critical spacing 114 from the surface 18 of the containers 16 as they are conveyed past the print heads 20, 21. The critical spacing 114 between the nozzles 112 of the nozzle block 102 and the surface 18 of the container 16 is maintained by the spacing of the nozzles 112 from the surfaces 116, 118 of the positioning cams 98, 100. The nozzle block 102 is also centered equidistant between the top and bottom edges of the print head as seen in FIG. 3 so that the ink ejected onto the containers will be a predetermined distance from the bottom of the containers regardless of whether the print head is positioned on the right or left side of the conveyor.

The nozzles 112 of the ink jet print heads 20, 21 are selectively supplied with ink by an array of conduits 120 and an array of selectively actuated solenoid supply valves 122. By selective actuation of the solenoid supply valves 122, the conduits 120 supply ink to predetermined nozzles 112 of the nozzle block 102 for ejection of the ink in a predetermined pattern onto the surface 18 of the passing containers 16.

FIG. 2 also shows the connections of an ink supply 124 and an ink jet print head control connection 126 with the ink jet print head 20. These connections provide a supply of ink to the print head 20 and communicate control signals to the print head 20 to control the ejection of ink from the print head in any desired manner known in the art.

Figure 4:
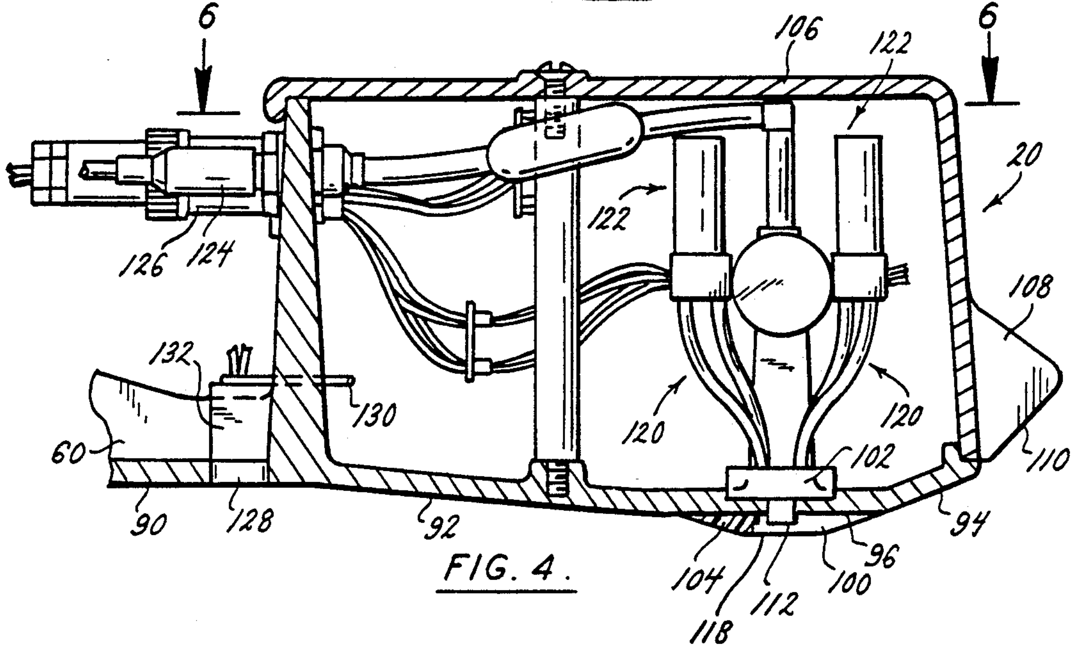
FIG. 4 is a plan view in section of the interior of the subject print head taken along Line 4—4 of FIG. 3.
Figure 6:
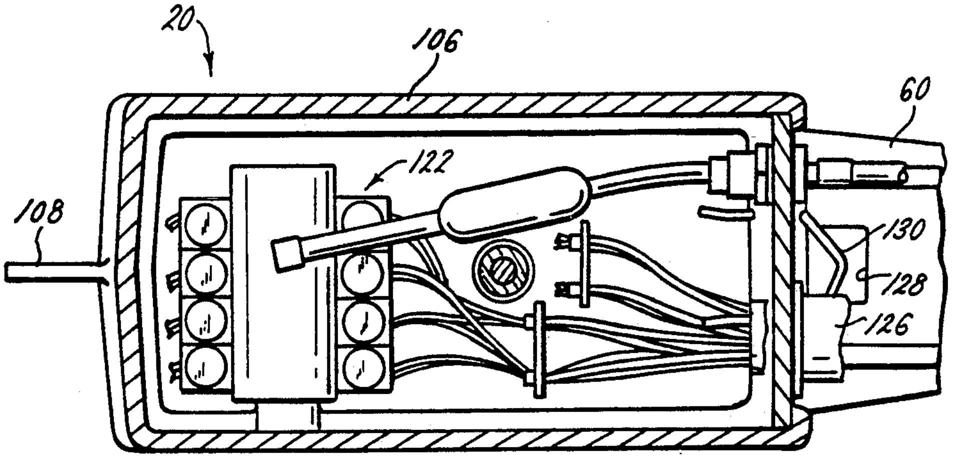
FIG. 6 is an elevation view in section taken along the Line 6—6 of FIG. 4.

As best seen in FIGS. 3, 4, and 6, the ink jet print head 20, 21 is also provided with a photocell opening 128 upstream of the nozzle block 102. A spring clip 130 is adapted to support a photocell 132 in the opening 128 flush with the surface face of the print head integral arm 60. FIG. 6 shows the photocell opening 128 and the spring clip 130 with the photocell removed. The photocell may be employed as a control means to initiate the ink jet printing cycle in a manner consistent with that known in the art when it detects an approaching container.

In operation of the subject ink jet print heads 20, 21, the size of the containers or packages 16 to be conveyed past the print head stations 10 is first determined. It should be understood that in any given run, the packages 16 will all be of the same nominal size, but that the size tolerances in packages are such that the width of the packages may vary by as much as ½ inch. Accordingly, the lateral and horizontal positions of the support rods, 30 and 50 respectively, are adjusted so that the path between the support bracket 26 and the print head 20 on one side of the conveyor belt 14 and the support bracket 26 and print head 21 on the other side of the conveyor belt 14 will accommodate the widest package within the width tolerance allowed.

Adjustable siderail sections (not shown) may also be provided on opposite sides of the conveyor just before the printing stations 10. The lateral positions of the side rail sections may be adjusted in the manner described in application Ser. No. 045,832, incorporated herein by reference. The adjustable rails may be set to provide gross lateral control of the position of the package side surface 18 relative to the print head stations 10, but there may still exist a considerable variation in the distance between the surface 18 of the package 16 to be printed and the nozzles 112 of the nozzle block 102. The spring biased, pivot mounting of the print heads 20, 21 on the support brackets 26 allows each print head 20, 21 to compensate for this variation. The torsion springs 70, 72 constantly biases the two print heads 20, 21 toward an extreme inboard position over the conveyor where the support lugs 61, 62 engage the adjustable abutment means 74, 76. Therefore, even though a package 16 at the narrowest end of the tolerance extreme passes between the print head stations 10 on the conveyor belt 14, the ink jet print heads 20, 21 will be biased by the torsion springs 70, 72 to pivot inward so that the surface sections 116, 118 of the positioning cams 98, 100 are always held against the opposing surfaces 18 of the packages 16 (see FIG. 1).

The positioning cams 98, 100 above and below the nozzle block 102 protect the nozzles 112 of the nozzle block from contacting the surface 18 of the package 16, even if the package should become tilted as it is conveyed on the belt 14. The nozzle shield 104 protects the nozzles 112 of the nozzle block 102 from contacting any projections from, or undulations in, the opposing surfaces 18 of the package 16 that might be small enough to pass between the surfaces 116, 118 of the positioning cams 98, 100 as the package is conveyed passed the print head station 10.

While the present invention has been described with reference to a specific embodiment, it should be understood that this description is not intended to be limiting, and that changes and modifications may be made to the invention without departing from the scope of the claims appended hereto.

What is claimed:

1. An ink jet printing apparatus arranged to apply ink markings to a surface of material on a conveying means and conveyed along a path past the printing apparatus, the printing apparatus comprising:

a bracket means supported in a stationary position relative to the conveying means;

a print head pivotally mounted to the bracket means and adapted to pivot through an arc about an axis substantially normal to the path of the conveyed material;

means for biasing the print head to pivot toward the path of conveyed material;

means provided on the print head for engaging material being conveyed past the print head by the conveying means and further causing the print head to pivot away from the conveying means;

a nozzle block supported by the print head and having at least one ink jet nozzle, the print head and the nozzle block being arranged to direct ink ejected from the ink jet nozzle substantially normal to the path of the conveyed material and to the pivot axis of the print head, thereby applying ink markings to a surface of the material conveyed before the print head by the conveying means.

2. The ink jet printing apparatus of claim 1 comprising:

spring means arranged between the bracket means and the print head pivotally biasing the print head toward the path of the conveyed material to an at-rest position in the path of the conveyed material.

3. The ink jet printing apparatus of claim 1 comprising:

a first ramp surface on a side of the print head facing the conveying means, the first ramp surface being arranged to engage a surface of the material conveyed past the print head by the conveying means and cause the print head to pivot progressively away from the conveying means.

4. The ink jet printing apparatus of claim 3 comprising:

a second ramp surface on the side of the print head facing the conveying means, the second ramp surface being arranged to engage the surface of the material conveyed past the print head on the conveying means and cause the print head to pivot progressively toward the conveying means.

5. The ink jet printing apparatus of claim 1 comprising:

the nozzle block being supported on a surface of the print head facing the conveying means, and first and second cams arranged on the surface of the print head on opposite sides of the nozzle block to contact the surface of material conveyed past the print head and maintain a predetermined spacing between the nozzle block and the surface of the material.

6. The ink jet printing apparatus of claim 1 comprising:

the nozzle block being supported on a surface of the print head facing the conveying means, and a nozzle block guard arranged adjacent to the nozzle block on said surface of the print head to prevent the nozzle block from contacting the surface of the material conveyed past the print head.

7. The ink jet printing apparatus of claim 2 comprising:

a return cam extending from a side of the print head and arranged to control pivoting movement of the print head toward the at-rest position in the path of the conveyed material as the conveyed material moves beyond the print head.

8. The ink jet printing apparatus of claim 1 comprising:

the bracket means being adapted to be positioned stationary relative to the conveying means on either a first or a second side of the conveying means, and the print head being adapted to be pivotally mounted on the bracket means in one of two positions relative to the bracket means, the print head being mounted in the first position relative to the bracket means when the bracket means is positioned on a first side of the conveying means, and the print head being mounted in the second position relative to the bracket means when the bracket means is positioned on a second side of the conveying means.

9. The ink jet printing apparatus of claim 8 wherein:

the first position of the print head relative to the bracket means is the mirror image of the second position of the print head relative to the bracket means.

10. The ink jet printing apparatus of claim 8 wherein:

the second position of the print head relative to the bracket means is turned upside down with respect to the first position of the print head relative to the bracket means.

11. The ink jet printing apparatus of claim 8 wherein:

the nozzle block is centered on a surface of the print head adapted to face the conveying means, and said surface and nozzle block are arranged symmetrical to a longitudinal plane extending through the print head parallel to the conveying means so that the nozzle block is spaced a predetermined distance from the conveying means whether the print head is in the first or second position relative to the bracket means.

12. The ink jet printing apparatus of claim 8 comprising:

the bracket means having a support bearing surface;

the print head having first and second lugs with respective first and second bearing surfaces, the lugs being adapted to pivotally mount the print head on the bracket means, the first bearing surface of the first lug contacting the support bearing surface of the bracket when the bracket is positioned on the first side of the conveying means, and the second bearing surface of the second lug contacting the support bearing surface of the bracket when the bracket is positioned on the second side of the conveying means.

13. The ink jet printing apparatus of claim 1 comprising:

the nozzle block being centered on the surface of a print head facing the conveying means, said surface and nozzle block being arranged symmetrical to a longitudinal plane extending through the print head parallel to the path of the conveying means.

14. The ink jet printing apparatus of claim 8 comprising:

first and second springs arranged between the bracket means and the print head, the first spring pivotally biasing the print head toward the path of the conveyed material to an at-rest position in the path of the conveyed material when the bracket means is positioned on the first side of the conveying means, and the second spring pivotally biasing the print head toward the path of the conveyed material to an at-rest position in the path of the conveyed material when the bracket means is positioned on a second side of the conveying means.

15. The ink jet printing apparatus of claim 1 comprising:

a photoelectric cell opening on a side of the print head facing the conveying means arranged to receive a photoelectric cell for initiating a printing cycle of the printing apparatus when material is conveyed past the print head and the photoelectric cell, thereby controlling the printing apparatus to apply ink markings to the surface of the material, whereby the print head supports both the nozzle block and the photoelectric cell.

16. The ink jet printing apparatus of claim 8 comprising:

first and second adjustable abutment means on the bracket means, the first abutment means being arranged to adjust the at-rest position of the print head in the path of the conveyed material when the bracket means is positioned on the first side of the conveying means, and the second abutment means being arranged to adjust the at-rest position of the print head in the path of the conveyed material when the bracket means is positioned on the second side of the conveying means.

17. An ink jet printing apparatus arranged to apply ink markings to a surface of material such as cartons or the like conveyed along a path before the printing apparatus by conveying means, the apparatus comprising:

a print head arranged adjacent to the conveying means;

a nozzle block extending from a first side of the print head and having at least one ink jet nozzle, the nozzle block being positioned on the print head to direct ink ejected from the ink jet nozzle substantially normal to the path of the conveyed material to apply ink markings to a surface of the material conveyed before the print head;

a first ramp surface on said first side of the print head and adjacent to the nozzle block, the first ramp surface being arranged to engage a surface of the material conveyed toward the nozzle block by the conveying means;

a second ramp surface on said first side of the print head and adjacent the nozzle block, the second ramp surface being arranged to engage the surface of the material conveyed away from the nozzle block by the conveying means;

and positioning surface means between the first and second ramp surfaces and generally vertically aligned with the nozzle block, the positioning surface means being arranged to contact the surface of material as it is conveyed before the nozzle block and maintain a predetermined spacing between the nozzle block and the surface of the material.

18. The ink jet printing apparatus of claim 17 comprising:

the print head having an integral arm with a side surface arranged adjacent to the first ramp surface, the arm side surface being substantially parallel to the path of the conveyed material.

19. The ink jet printing apparatus of claim 17 comprising:

a return cam extending from a second side of the print head and adjacent to the second ramp surface, and return cam being arranged to engage a surface of material conveyed away from the second ramp surface by the conveying means.

20. The ink jet printing apparatus of claim 17 comprising:

the positioning surface means including first and second positioning cams generally vertically aligned with and positioned on opposite sides of the nozzle block.

* * * * *